(12) United States Patent
Iwamoto

(10) Patent No.: US 8,542,335 B2
(45) Date of Patent: Sep. 24, 2013

(54) LIQUID CRYSTAL DISPLAY ELEMENT

(75) Inventor: Yoshihisa Iwamoto, Yokohama (JP)

(73) Assignee: Stanley Electric Co., Ltd., Tokyo (JP)

(*) Notice: Subject to any disclaimer, the term of this patent is extended or adjusted under 35 U.S.C. 154(b) by 217 days.

(21) Appl. No.: 13/239,336

(22) Filed: Sep. 21, 2011

(65) Prior Publication Data

US 2012/0069278 A1   Mar. 22, 2012

(30) Foreign Application Priority Data

Sep. 22, 2010   (JP) ................................ 2010-211790

(51) Int. Cl.
*G02F 1/1335* (2006.01)

(52) U.S. Cl.
USPC ............... 349/117; 349/56; 349/84; 349/119; 349/122; 349/123

(58) Field of Classification Search
USPC ...................... 349/56, 84, 117, 119, 122, 123
See application file for complete search history.

(56) References Cited

U.S. PATENT DOCUMENTS

| | | | |
|---|---|---|---|
| 4,889,412 A | 12/1989 | Clerc et al. | |
| 5,912,717 A | 6/1999 | Sugiyama et al. | |
| 6,661,488 B1 | 12/2003 | Takeda et al. | |
| 6,724,452 B1 | 4/2004 | Takeda et al. | |
| 7,057,686 B2* | 6/2006 | Ho et al. ........................ | 349/113 |
| 7,167,224 B1 | 1/2007 | Takeda et al. | |
| 7,224,421 B1 | 5/2007 | Takeda et al. | |
| 7,227,606 B2 | 6/2007 | Takeda et al. | |
| 7,304,703 B1 | 12/2007 | Takeda et al. | |
| 7,463,321 B2* | 12/2008 | Song et al. .................... | 349/129 |
| 7,760,305 B2 | 7/2010 | Takeda et al. | |
| 7,821,603 B2 | 10/2010 | Takeda et al. | |
| 7,965,363 B2 | 6/2011 | Takeda et al. | |
| 8,269,929 B2 | 9/2012 | Sugiyama et al. | |
| 2007/0064187 A1 | 3/2007 | Takeda et al. | |
| 2009/0086132 A1 | 4/2009 | Horii et al. | |
| 2011/0176098 A1 | 7/2011 | Takeda et al. | |

FOREIGN PATENT DOCUMENTS

| | | |
|---|---|---|
| JP | 62-210423 A | 9/1987 |
| JP | 7-069536 B | 7/1995 |

(Continued)

OTHER PUBLICATIONS

Japanese Office Action dated Feb. 26, 2013 (and English translation thereof) in counterpart Japanese Application No. 2010-211790.

*Primary Examiner* — Jennifer Doan
(74) *Attorney, Agent, or Firm* — Holtz, Holtz, Goodman & Chick, PC

(57) ABSTRACT

A simple matrix type dot-matrix liquid crystal display element includes a first and a second transparent substrate disposed opposite to each other, first and second transparent electrodes disposed on the opposed face of the first and the second transparent substrate, respectively, a first and a second vertical alignment film disposed on the opposed side of the first and the second transparent substrate to cover the first and the second electrodes, respectively, a liquid crystal layer disposed between the opposed side of the first and the second transparent substrate and having $\Delta\epsilon<0$ and $\Delta nd>450$ nm, and a first and a second viewing angle compensation plate disposed on the unopposed side of the first and the second transparent substrate, respectively, wherein in the first transparent electrode, openings extending in a predefined direction are aligned.

10 Claims, 13 Drawing Sheets

(56) References Cited

FOREIGN PATENT DOCUMENTS

| JP | 2872628 B2 | 3/1999 |
| JP | 2947350 B2 | 9/1999 |
| JP | 2000-193980 A | 7/2000 |
| JP | 2005-234254 A | 9/2005 |
| JP | 2006-154585 A | 6/2006 |
| JP | 3834304 B2 | 10/2006 |
| JP | 2008-102545 A | 5/2008 |
| JP | 2008-139783 A | 6/2008 |
| JP | 2009-156930 A | 7/2009 |

* cited by examiner

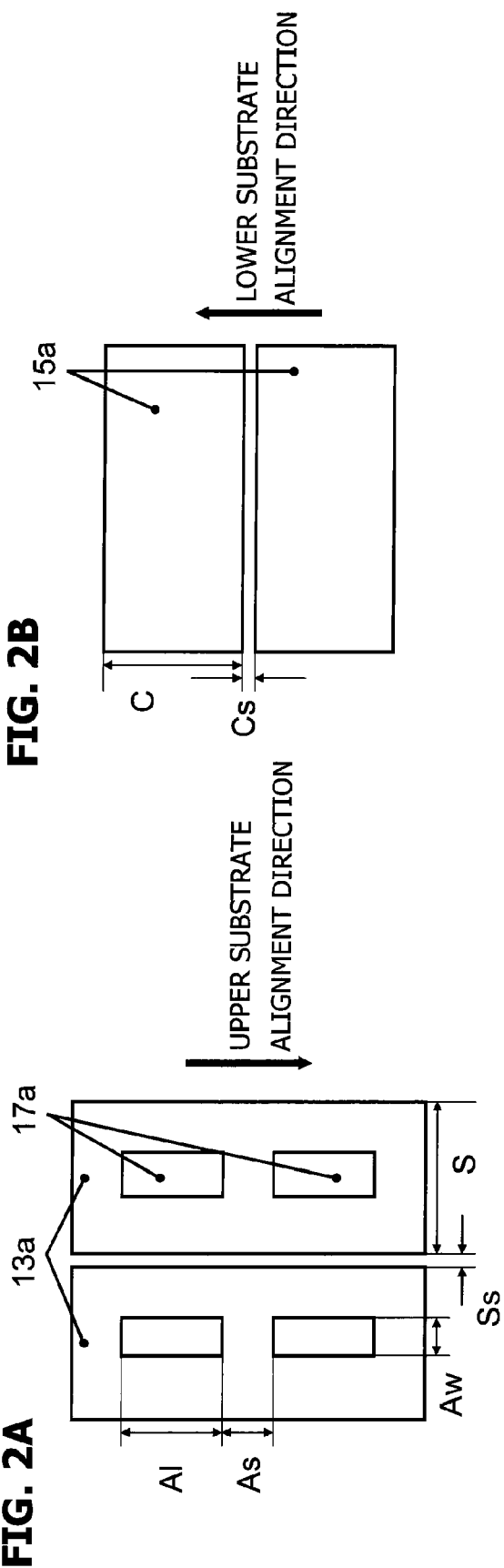
FIG. 2B
FIG. 2A
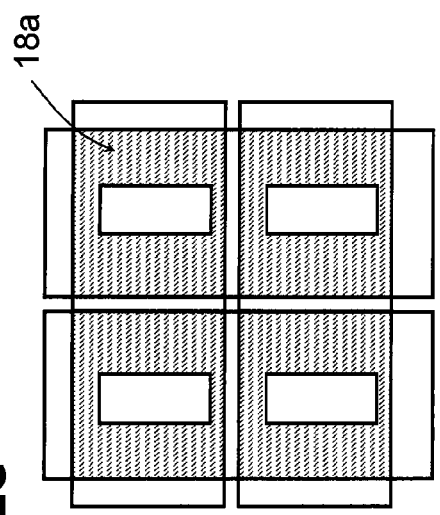
FIG. 2C

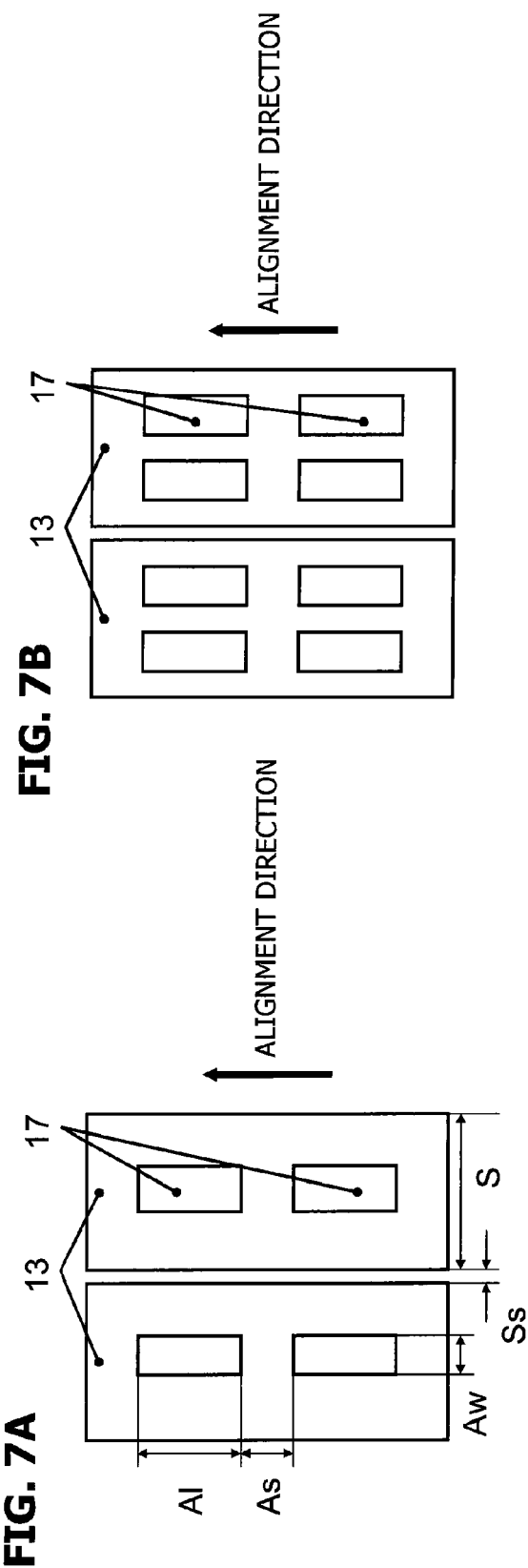
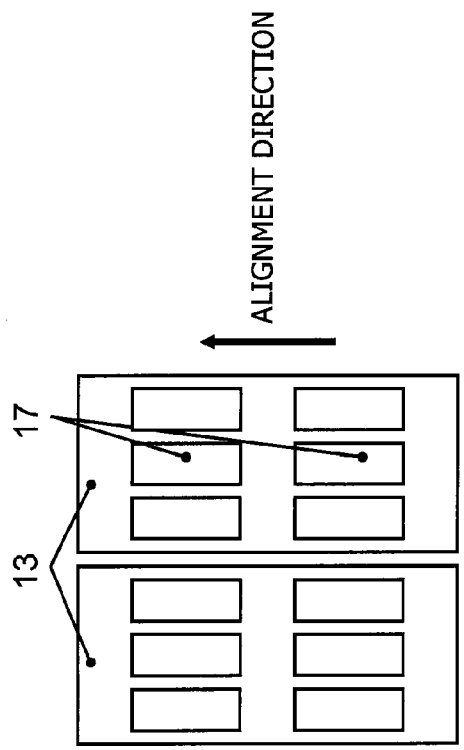

|  | OBSERVATION ANGLE 0° | | OBSERVATION ANGLE 40° | | OBSERVATION ANGLE 60° | |
| --- | --- | --- | --- | --- | --- | --- |
|  | x | y | x | y | x | y |
| REFERENCE Ref | 0.272 | 0.280 | 0.369 | 0.371 | 0.232 | 0.248 |
| SAMPLE Sa 5 (ONE OPENING) | 0.270 | 0.278 | 0.338 | 0.353 | 0.275 | 0.292 |
| SAMPLE Sa 6 (TWO OPENINGS) | 0.271 | 0.271 | 0.330 | 0.326 | 0.307 | 0.320 |
| SAMPLE Sa 7 (THREE OPENINGS) | 0.271 | 0.272 | 0.326 | 0.347 | 0.320 | 0.345 |

| | OBSERVATION ANGLE -50° | | OBSERVATION ANGLE 0° | | OBSERVATION ANGLE 50° | | OBSERVATION ANGLE -60° | | OBSERVATION ANGLE 60° | |
|---|---|---|---|---|---|---|---|---|---|---|
| | x | y | x | y | x | y | x | y | x | y |
| FIRST CONVENTIONAL LIQUID CRYSTAL DISPLAY ELEMENT | 0.395 | 0.406 | 0.314 | 0.341 | 0.357 | 0.358 | 0.315 | 0.343 |
| SECOND CONVENTIONAL LIQUID CRYSTAL DISPLAY ELEMENT | 0.438 | 0.421 | 0.438 | 0.421 | 0.294 | 0.294 | 0.188 | 0.294 | 0.188 |
| THIRD CONVENTIONAL LIQUID CRYSTAL DISPLAY ELEMENT | 0.477 | 0.439 | 0.421 | 0.426 | 0.238 | 0.111 | 0.398 | 0.313 |

LIQUID CRYSTAL DISPLAY ELEMENT

FIELD

The present invention relates to a multiplex-driven, vertically aligned liquid crystal display element.

BRIEF DESCRIPTION OF DROWINGS

FIGS. 2A to 2C are plan views illustrating the segment electrode arrangement pattern, common electrode arrangement pattern, and some pixels resulting from their overlap in the liquid crystal display element described in an embodiment sample Sa1.

FIGS. 7A to 7C are plan views illustrating the segment electrode arrangement patterns used in samples Sa5 to Sa7.

BACKGROUND

Figure 11:
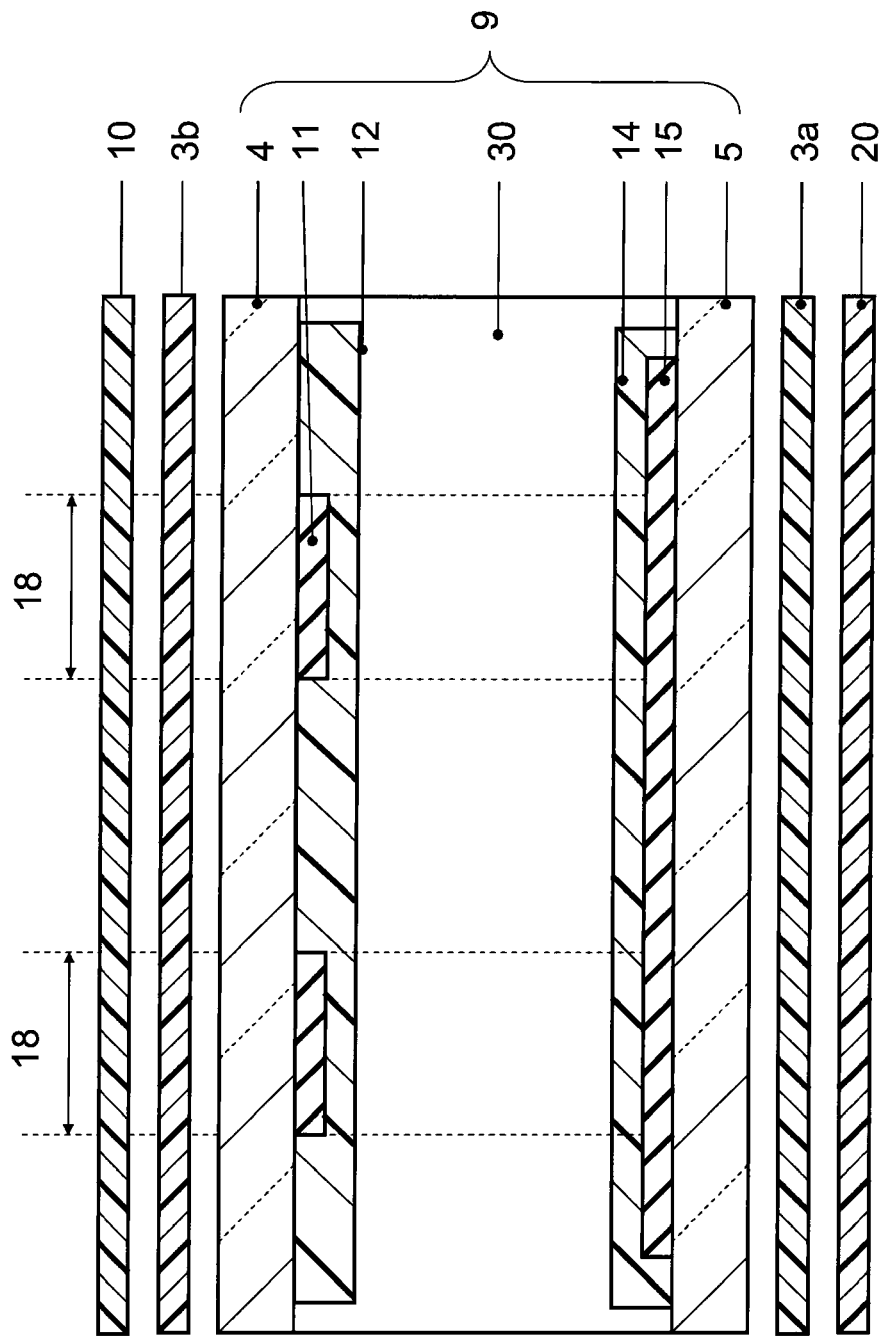
FIG. 11 shows a cross section figure of an example of conventional vertically aligned liquid crystal display.

FIG. 11 shows a cross section figure of an example of conventional vertically aligned liquid crystal display. This liquid crystal display element comprises a liquid crystal cell 9, viewing angle compensation plates 3a and 3b provided on both sides of the liquid crystal cell 9, and polarizing plates 10 and 20 that sandwich the liquid crystal cell 9 and the viewing angle compensation plates 3a and 3b. The polarizing plates 10 and 20 are set up in a crossed Nicols arrangement. The liquid crystal cell 9 comprises a liquid crystal layer 30 with a negative dielectric constant anisotropy, $\Delta\epsilon$, and lower transparent substrates 4 and 5 that sandwich the liquid crystal layer 30. The upper and lower substrates 4 and 5 are provided with upper and lower transparent electrodes 11 and 15, respectively, and vertical alignment films 12 and 14 that are formed to cover the upper and lower electrodes 11 and 15 and are treated by alignment process, respectively.

A display area 18 is defined in a portion where the transparent electrodes 11 and 15 overlap each other, with the liquid crystal layer 30 sandwiched between them. In the zero of applied voltage, the liquid crystal molecules in the liquid crystal layer 30 are oriented nearly vertically to the transparent substrates 4 and 5, and the refractive index is nearly isotropic in in-plane directions to produce a dark state in the display area 18 when combined with the polarizing plates 10 and 20 in a crossed Nicols arrangement. When a voltage equal to or higher than the threshold voltage of the liquid crystal layer 30 is applied between the transparent electrodes 11 and 15, the liquid crystal molecules in the liquid crystal layer 30 are tilted to the transparent substrates 4 and 5, and the refractive index of liquid crystal layer 30 becomes anisotropic in in-plane, allowing the incident light to pass through the polarizing plates 10 and 20 in a crossed Nicols arrangement to produce a light state in the display area 18.

There are some different types of electrode arrangement used to drive liquid crystal display elements, such as segment electrode arrangement (including seven segment display and fixed pattern display) and simple matrix type dot matrix electrode. In the case of a segment electrode arrangement, a segment electrode to define display areas is formed on one of the transparent substrates, while a common electrode of a predefined shape to cover the display areas (or the segmented electrode) is formed on the other transparent substrate. In the case of a simple matrix type dot matrix electrode, characters and numbers are displayed by applying a voltage selectively to appropriate intersections (pixels) between the scanning electrodes formed on one transparent substrate and the signal electrodes formed on the other transparent substrate.

It is generally known that these liquid crystal display elements have good legibility when seen from the normal direction to the substrate, but the transmittance and color may change when seen from an oblique direction from the normal to the substrate.

Japanese Patent No. 2047880 discloses a liquid crystal display element comprising a viewing angle compensation plate having a negative uniaxial optical anisotropy (negative uniaxial film) or a viewing angle compensation plate having a negative biaxial optical anisotropy (negative biaxial film) provided between a polarizing plate and a substrate designed for conventional vertically aligned liquid crystal display elements.

Japanese Patents No. 3834304 and No. 2947350 disclose a multi-domain vertically aligned liquid crystal element in which the liquid crystal molecules constituting the liquid crystal layer are oriented in two or more directions.

Japanese Patent No. 2872628 and No. 4614200 disclose an alignment method to produce a nearly vertical alignment.

SUMMARY

The object of the invention is to provide a vertically aligned liquid crystal display element having high display performance.

According to an aspect of the invention,

A simple matrix type dot-matrix liquid crystal display element comprising:

a first and a second transparent substrate disposed opposite to each other;

two or more first transparent electrodes that are disposed on a face of the first transparent substrate, said face facing to the other substrate, and that are extended as a whole in a first direction;

two or more second transparent electrodes that are disposed on a face of the second transparent substrate, said face facing to the other substrate, and that are extended as a whole in the perpendicular direction to said first direction;

a first and a second vertical alignment film disposed on the opposed (i.e., inner) side of the first and the second transparent substrate to cover the first and the second transparent electrodes, respectively;

a liquid crystal layer disposed between the opposed faces of the first and the second transparent substrate and having a negative dielectric constant anisotropy and a retardation of more than 450 nm;

a first and a second viewing angle compensation plate disposed on the unopposed faces of the first and the second transparent substrate, respectively; and a first and a second polarizing plate disposed in a nearly crossed Nicols arrangement outside the first and the second viewing angle compensation plate, respectively;

wherein:

at least either of the first and the second vertical alignment film is treated by an alignment process in a second direction that contains a component of the first direction;

each pixel formed by the first and the second electrode overlapping each other with said liquid crystal layer sandwiched in between have two or more sides that intersect with perpendiculars to said second direction; and in those portions that correspond to said pixels in said first transparent electrode, openings extending in said direction that contains a component of the first direction are aligned.

DESCRIPTION OF EMBODIMENTS

The present inventor carried out simulation analysis of conventional vertically aligned liquid crystal display elements to study the dependence of the transmittance characteristics and color on the observation direction. LCD MASTER 6.4 supplied by Shintech, Inc., was used for the simulation analysis.

Figure 12A:
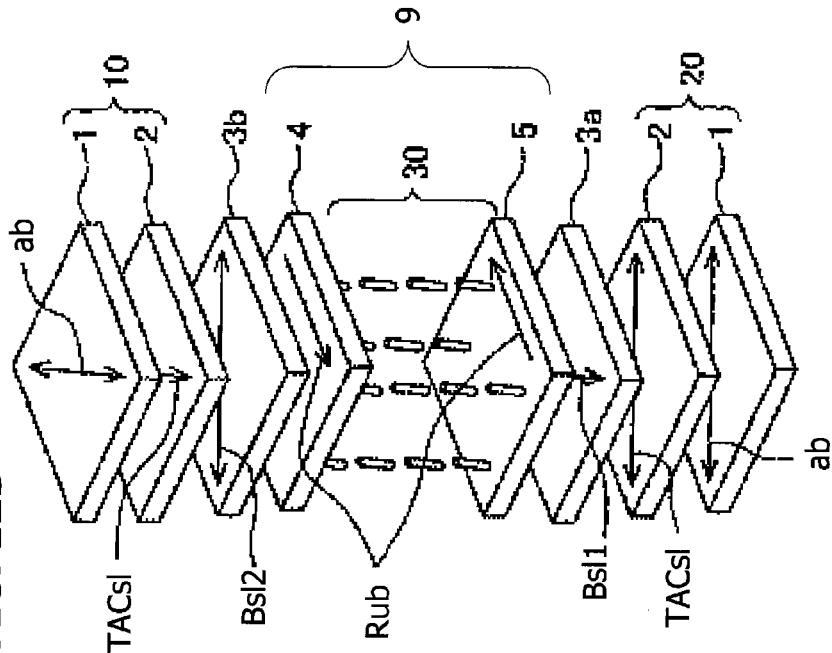
FIGS. 12A and 12B illustrate schematic figures of a model of conventional liquid crystal display element used in the simulation analysis.
Figure 12B:
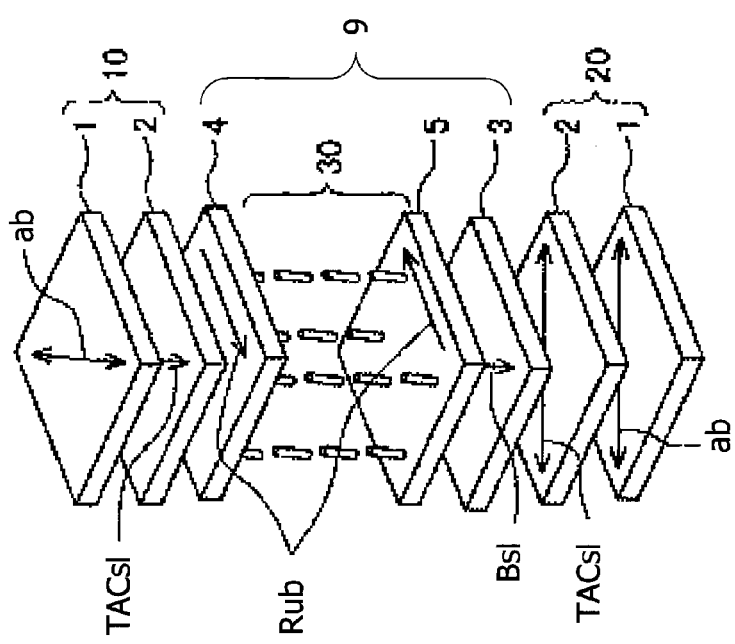

FIGS. 12A and 12B illustrate schematic figures of a panel configuration of conventional liquid crystal display element used in the simulation analysis.

The first conventional liquid crystal display element depicted in FIG. 12A comprises a liquid crystal cell 9, a viewing angle compensation plate 3 located on one side of the liquid crystal cell 9, and polarizing plates 10 and 20 that sandwich the liquid crystal cell 9 and the viewing angle compensation plate 3. The viewing angle compensation plate 3 is a negative biaxial film with an in-plane retardation of 50 nm and a thickness-direction retardation of 440 nm. The polarizing plates 10 and 20 are set up in a crossed Nicols arrangement. The cross sectional view of the liquid crystal cell 9 is depicted in FIG. 11 and comprises a liquid crystal layer 30 with a $\Delta\epsilon$ of negative and upper and lower transparent substrates 4 and 5 that sandwich the liquid crystal layer 30. The upper and lower substrates 4 and 5 are provided with upper and lower transparent electrodes, respectively, and vertical alignment films treated by alignment process that are formed to cover the upper and lower electrodes, respectively. The upper and lower electrodes and the vertical alignment films expediently aren't depicted in FIG. 12A. The liquid crystal layer 30 has a birefringence, $\Delta n$, of about 0.15 and a thickness, d, of about 4 μm. Accordingly, the retardation, $\Delta nd$, of the liquid crystal layer 30 is about 600 nm. The liquid crystal molecules constituting the liquid crystal layer 30 have a pretilt angle (angle of inclination of the long axis of the liquid crystal molecules to the substrate plane) of 89.5°.

The upper and lower polarizing plates 10 and 20 each consist of a polarizing layer 1 located on a TAC (triacetyl cellulose) base film 2. Though not depicted, a surface protective film of TAC is provided on the polarizing layer 1. The polarizing plate's TAC layer has an in-plane retardation of 3 nm, and its slow axis is parallel to the absorption axis of the polarizing plate. The polarizing plate's TAC layer has a thickness-direction retardation of 50 nm.

In the coordinate system given in FIG. 12A, the rubbing direction, Rub, for the upper substrate 4 is 270°, while the rubbing direction, Rub, for the lower substrate 5 is 90°. The azimuthal director direction in the liquid crystal layer 30 (azimuthal direction of liquid crystal molecule orientation at the thickness-direction center of the liquid crystal layer) is 90°. The absorption axis, ab, of the polarizing layer 1 and the in-plane slow axis in the TAC base film 2, TACsl, in the upper polarizing plate 10 are in the direction of 135°, and those in the lower polarizing plate 20 are in the direction of 45°. The in-plane slow axis, Bsl, in the negative biaxial film 3 is nearly perpendicular to the absorption axis in the adjacent polarizing plate and it is in the direction of 135°.

In the second conventional liquid crystal display element depicted in FIG. 12B, the viewing angle compensation plate 3a provided between the lower substrate 5 and the lower polarizing plate 20 is a negative biaxial film, and the viewing angle compensation plate 3b provided between the upper substrate 4 and the upper polarizing plate 10 is a negative biaxial film. Otherwise, the element is the same as the first conventional liquid crystal display element.

In the coordinate system FIG. 12B, the in-plane slow axis, Bsl1, in the negative biaxial film 3a is nearly perpendicular to the absorption axis, ab, of the polarizing layer 1 in the adjacent polarizing plate 20 and it is in the direction of 135°. The in-plane slow axis, Bsl2, in the negative biaxial film 3b is nearly perpendicular to the absorption axis, ab, of the polarizing layer 1 in the adjacent polarizing plate 10 and it is in the direction of 45°. In both negative biaxial films 3a and 3b, the in-plane retardation is 25 nm and the thickness-direction retardation is 220 nm.

In a third conventional liquid crystal display element, the viewing angle compensation plate 3a as shown in FIG. 12B is a negative biaxial film with an in-plane retardation of 50 nm and a thickness-direction retardation of 220 nm, and the viewing angle compensation plate 3b is a negative uniaxial film (C plate) with an in-plane retardation of 0 nm and a thickness-direction retardation of 220 nm. Otherwise, the element is the same as the second conventional liquid crystal display element.

For these first to third conventional liquid crystal display elements, the normal direction to the substrate plane is defined as 0° (a front direction or a normal direction), and the direction of 180° (9 o'clock) or 0° (3 o'clock) in the coordinate system in FIGS. 12A and 12B is defined as the left or right direction. Described below is the dependence of the transmittance characteristics and color shift on the inclination angle (polar angle) in the left or right direction (observation angle) of the first to third conventional liquid crystal display elements.

Figures 13A, 13B:
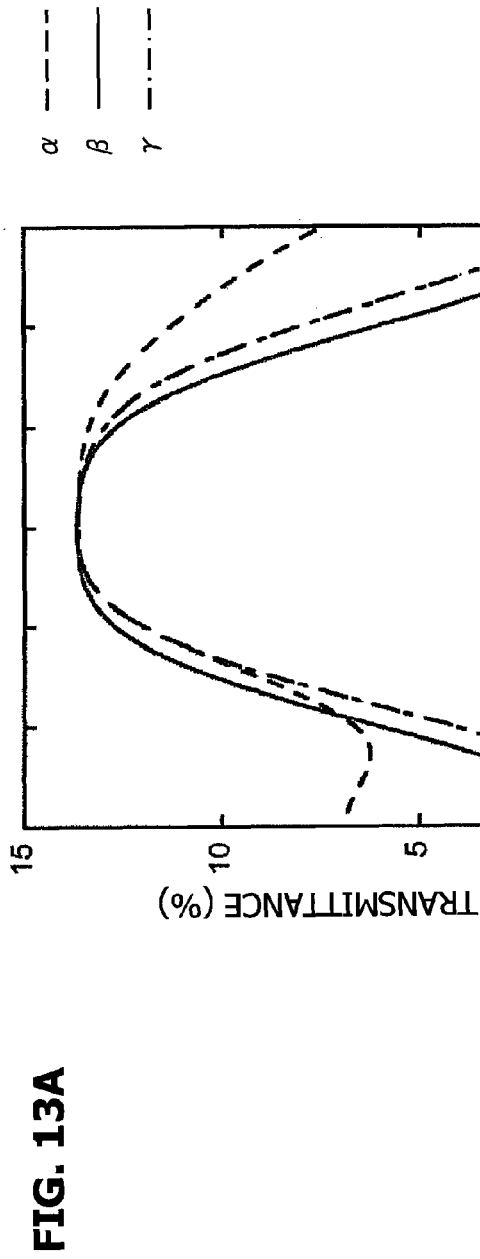
FIG. 13A shows the dependence of transmittance characteristics on the observation angle (−60° to)+60° in the first to third conventional liquid crystal display elements.
FIG. 13B is a table that shows x,y chromaticity observations according to the XYZ colorimetric system at an observation angle of ±50° or ±60° for the first to third conventional liquid crystal display elements.

FIG. 13A shows the dependence of transmittance characteristics on the observation angle (−60° to)+60° in the first to third conventional liquid crystal display elements. The horizontal axis of the graph represents the observation angle in units of ° (degrees), and the vertical axis represents the transmittance in a light state in units of %. The curves α, β and γ indicate the transmittance characteristics of the first conventional liquid crystal display element (negative biaxial film on one side), the transmittance characteristics of the second conventional liquid crystal display element (negative biaxial film on both sides), and the transmittance characteristics of the third conventional liquid crystal display element (negative biaxial film on one side, C plate on the other side), respectively. The drive conditions include multiplex driving at 1/16 duty, 1/5 bias and a voltage to produce the maximum contrast. A standard light source D65 is used as the light source.

This graph indicates asymmetry in the dependence of the transmittance characteristics on the observation angle in the case of the first conventional liquid crystal display element. For the second conventional liquid crystal display element, the symmetry in the transmittance characteristics is observed, but a decrease in transmittance at large observation angles is achieved. For the third conventional liquid crystal display element, a decrease in transmittance at large observation angles is observed as in the case of the second conventional liquid crystal display element, and asymmetry in the transmittance characteristics is achieved.

FIG. 13B is a table that shows x,y chromaticity observations according to the XYZ colorimetric system at an observation angle of ±50° or ±60° for the first to third conventional liquid crystal display elements. It is clear from this table that in the case of the second and third conventional liquid crystal display elements, the hue is nearly yellow at an observation angle of ±50° but changes into the range of violet to blue as the observation angle shifts to ±60°.

From these results of simulation analysis, it is evidence that when a viewing angle compensation plate is provided on both sides of the liquid crystal cell as in the case of the second and third conventional liquid crystal display elements, the transmittance considerably decreases and large changes in hue is observed at large observation angles. Such degradation in viewing angle characteristics should preferably be minimized. An investigation by the inventor showed that significant degradation in the viewing angle characteristics was observed when the retardation of the liquid crystal layer became larger than about 450 nm. The inventor carried out study to improve the viewing angle characteristics of a vertically aligned liquid crystal display element comprising a viewing angle compensation plate provided on both sides of the liquid crystal cell.

Figure 1:
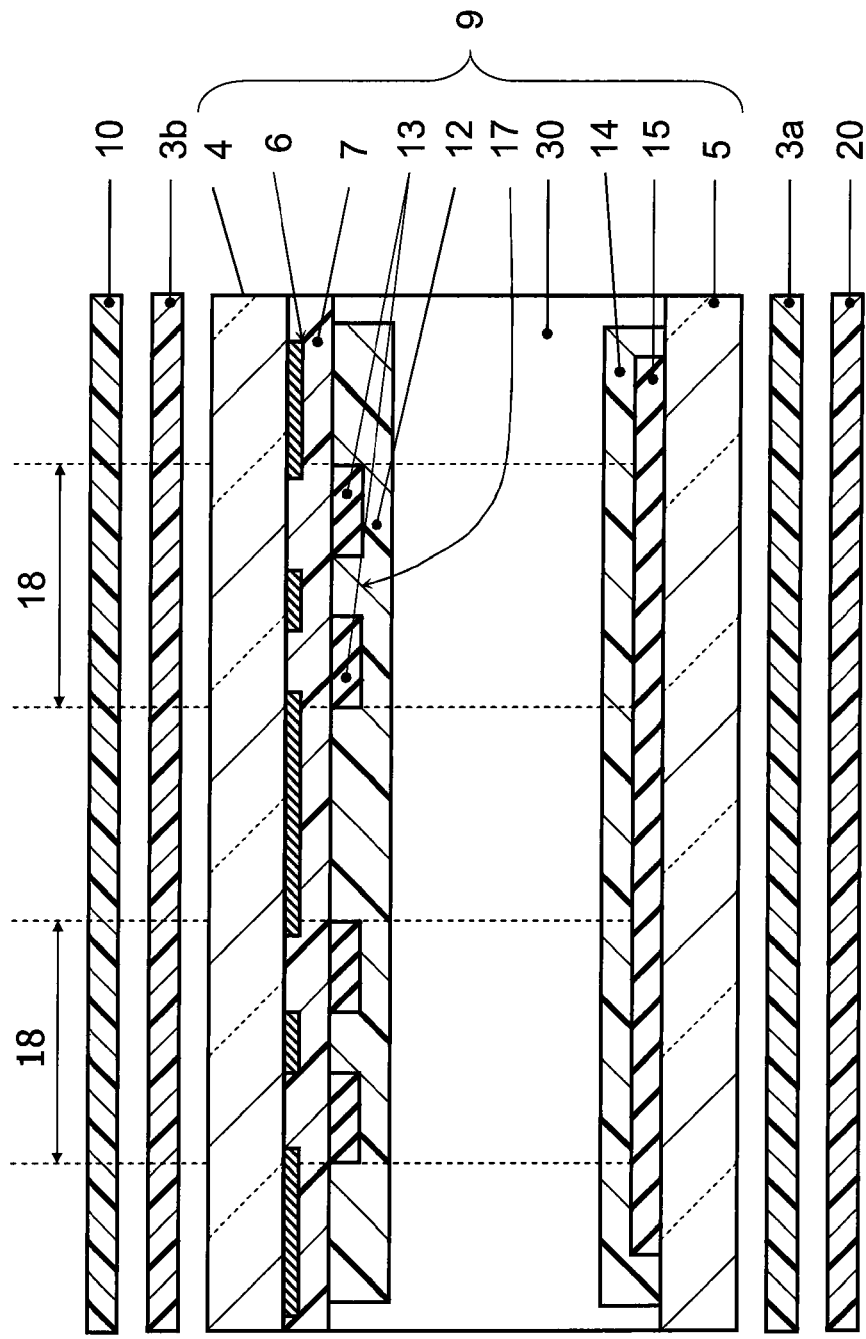
FIG. 1 depicts a cross section of an example of vertically aligned liquid crystal display element according to embodiments.

FIG. 1 depicts a cross section of an example of vertically aligned liquid crystal display element according to embodiments. This liquid crystal display element comprises a liquid crystal cell 9, viewing angle compensation plates 3a and 3b provided on both sides of the liquid crystal cell, and polarizing plates 10 and 20 that sandwich the liquid crystal cell 9 and the viewing angle compensation plates 3a and 3b. The viewing angle compensation plates 3a and 3b are negative biaxial films. The polarizing plates 10 and 20 are set up in a crossed Nicols arrangement. The liquid crystal cell 9 comprises a liquid crystal layer 30 with a Δε of negative and upper and lower transparent substrates 4 and 5 that sandwich the liquid crystal layer 30. The upper and lower substrates 4 and 5 are provided with upper and lower transparent electrodes 13 and 15, respectively, and vertical alignment films 12 and 14 treated by alignment process that are formed to cover the upper and lower electrodes 13 and 15, respectively. The upper electrode 13 is a segment electrode that contains two or more openings 17, while the lower electrode 15 is a common electrode. The liquid crystal layer 30 has a retardation, Δnd, of larger than 450 nm. The relations among the direction of the absorption axis in the polarizing plate, the direction of the slow axis in the viewing angle compensation plate, and the orientation direction or the liquid crystal director arrangement in the liquid crystal layer 30 are the same as in the second conventional liquid crystal display element. The characteristics of the various films and liquid crystal layers are also the same. Thus, the existence/absence of openings in the segment electrode is the primary difference between the liquid crystal display element according to the embodiments and the second conventional liquid crystal display element.

Black masks that cover the spaces between segment electrodes 13, the spaces between common electrodes 15, and the openings 17 may be formed to prevent light leakage that can occur at the dark state on passive-matrix driving. After forming the black masks 6 on the transparent substrate 4, a resin layer 7 may be formed to serve for forming a smooth-surfaced electrode thereon as illustrated in FIG. 1. The electrodes may be formed on the transparent substrate, followed by the formation of black masks directly in the regions that are not sandwiched between opposed electrodes. The black masks may be formed on both upper and lower substrates in the regions that are not sandwiched between opposed electrodes. They may be formed only on either substrate in the regions that are not sandwiched between opposed electrodes.

Preparation of the vertically aligned liquid crystal display element according to the embodiments is described below with reference to FIG. 1.

A glass substrate having an ITO (indium tin oxide) transparent electrode with a substrate size of 350 mm×360 mm, a thickness of 0.7 mm, and a sheet resistance of 80Ω/□ is coated with a positive photoresist (supplied by Rohm and Haas Company) using a roll coater to form a photoresist film. A Cr (chrome) patterned photomask consisting of a quartz blank and a desired Cr (chrome) pattern formed on it is placed on a photoresist film they are closed adherence each other, followed by exposure process of the photoresist film using ultraviolet ray. Pre-bake is carried out at 120° C. for 10 minutes, and wet development processing is performed in an aqueous KOH solution to remove the photoresist in the unexposed portion. The ITO transparent electrode is etched with a ferric chloride solution at 40° C. to remove the ITO film from around the openings in the photoresist film. Finally, the remaining photoresist is removed with an aqueous NaOH solution. In this way, by using an appropriate photomask with a desired pattern, a segment electrode 13 with openings 17 and a common electrode 15 are formed on the upper and lower substrates 4 and 5, respectively. Details of the segment electrode 13, the common electrode 15 and the openings 17 will be described later.

Then, a material solution for the vertical alignment film (supplied by Chisso Petrochemical Corporation) is coated over the segment electrode 13 and the common electrode 15 by the flexographic printing method and pre-baked in a clean oven at 180° C. for 30 minutes to form vertical alignment films 12 and 14. Subsequently, each of the films 12 and 14 is rubbed.

Then, either of the upper substrate 4 or the lower substrate 5 on which the vertical alignment film 12 or 14 has been formed is coated with a sealant (supplied by Mitsui Chemicals, Inc.) containing a silica spacer with a particle diameter of 2 to 6 μm by the screen printing method to form an intended pattern. A plastic spacer with a particle diameter of 2 to 6 μm is scattered over the other substrate by the dry spraying method. The upper and lower substrates 4 and 5 are bonded with each other after being set up so that the vertical alignment films 12 and 14 are faced with each other with the rubbing directions in the vertical alignment films 12 and 14 being anti-parallel to each other. Baking is carried out under a required pressure, followed by cutting to an intended size to complete an empty cell. The cell thickness is about 4 μm in the embodiments.

Then, a liquid crystal material (supplied by Merk & Co., Inc.) with a dielectric constant anisotropy of Δε<0 and a birefringence of Δn=0.21 is injected in the empty cell by vacuum injection, followed by sealing. Subsequently, baking is carried out at 120° for 60 minutes, followed by washing with a neutral detergent to complete a liquid crystal cell 9.

Finally, viewing angle compensation plates 3a and 3b are formed outside the liquid crystal cell 9, and upper and lower polarizing plates 10 and 20 (SHC13U supplied by Polatechno Co., Ltd.) are provided outside the former plates in such a way that their absorption axes are nearly in a crossed Nicols arrangement. In the present embodiments, negative biaxial films with an in-plane retardation of 12 nm and a thickness-direction retardation of 350 nm are used as the viewing angle compensation plates 3a and 3b.

Thus, a vertically aligned liquid crystal display element having viewing angle compensation plates and having openings in the electrodes is completed. In the present embodiments, black masks 6 for light leakage prevention and a resin layer 7 for formation of smooth-surfaced transparent electrodes 13 and also for electrical insulation are formed on the upper substrate 4 in the regions that are not sandwiched between opposed electrodes. The black masks comprise such materials as metal, resin containing a dispersed pigment, and resin containing dispersed carbon particles. It is noted that such black masks and resin layer may not always necessary.

The shapes of the electrodes used in embodiment samples Sa1 to Sa4 are described below with reference to FIGS. 2 to 5.

FIGS. 2A to 2C are plan views illustrating the segment electrode arrangement pattern, common electrode arrangement pattern, and some pixels resulting from their overlap in the liquid crystal display element described in an embodiment sample Sa1. The segment electrodes 13a extended in the alignment direction and the common electrodes 15a extended perpendicular to the segment electrodes have a strip-like shape with a width S or C of 0.42 mm and a gap Ss or Cs of 0.01 mm. The pixels 18a are defined in the form of rectangles located in the regions where the liquid crystal layer is sandwiched between the segment electrode 13a and the common electrode 15a. The openings 17a are formed in the segment electrodes 13a so that they are included in the pixels 18a. Each opening 17a is in the form of a rectangle with a long-directional length Al of 0.32 mm, a long-directional gap As of 0.1 mm between adjacent ones in the electrode, and a short-directional length Aw of 0.007 mm. Edges of the openings are parallel to edges of the segment electrodes 13a in their extensive direction. It is noted that in the figures, the openings are illustrated in a larger size than actual for easy understanding.

Figure 3A:
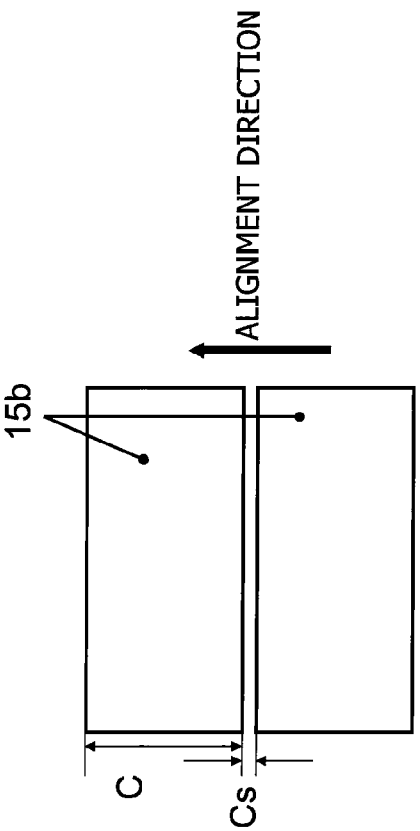
FIGS. 3A to 3C are plan views illustrating the segment electrode arrangement pattern, common electrode arrangement pattern, and some pixels resulting from their overlap in the liquid crystal display element described in an embodiment sample Sat.
Figure 3B:
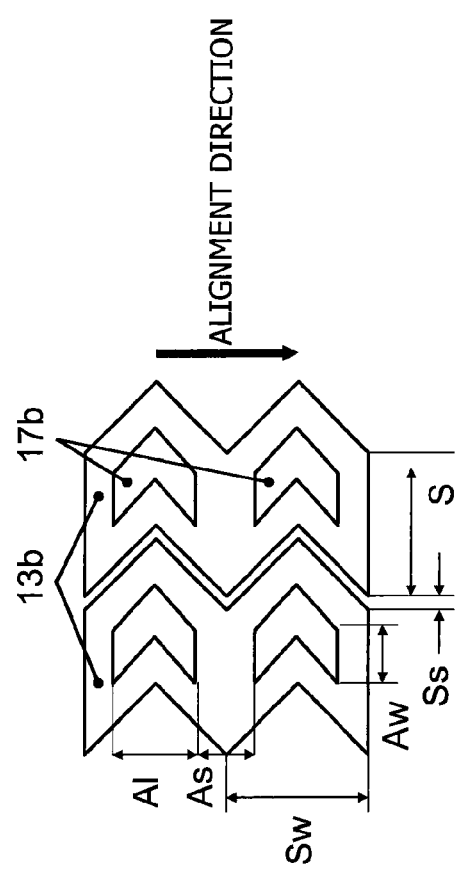
Figure 3C:
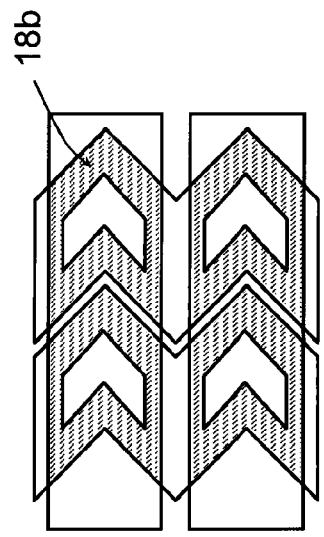

FIGS. 3A to 3C are plan views illustrating the segment electrode arrangement pattern, common electrode arrangement pattern, and some pixels resulting from their overlap in the liquid crystal display element described in an embodiment sample Sa2. The segment electrodes 13b extended in the alignment direction have a serrated shape with a serration angle of 90°, a serration interval Sw of 0.42 mm, a width S of 0.43 mm, and a gap between adjacent ones Ss of 0.01 mm. The common electrodes 15b extended perpendicular to the segment electrodes 13b have a strip-like shape with a width C of 0.42 mm and a gap Cs of 0.01 mm. The pixels 18b are defined in an inverted dogleg shape in the regions where the liquid crystal layer is sandwiched between the segment electrodes 13b and the common electrodes 15b. The openings 17b are formed in the segment electrodes 13b so that they are included in the pixels 18b. Each opening 17b is in the form of an inverted dogleg shape with a long-directional length Al of 0.32 mm, a long-directional gap As of 0.1 mm between adjacent ones in the electrodes and a short-directional length Aw of 0.007 mm. Edges of the openings are parallel to edges of the segment electrodes 13b in their extensive direction. It is noted that in the figures, the openings are illustrated in a larger size than actual for easy understanding. The pixels and openings may have a normal dogleg shape. For the present invention, both the normal dogleg shape and the inverted dogleg shape are simply referred to as dogleg shape.

Figure 4A:
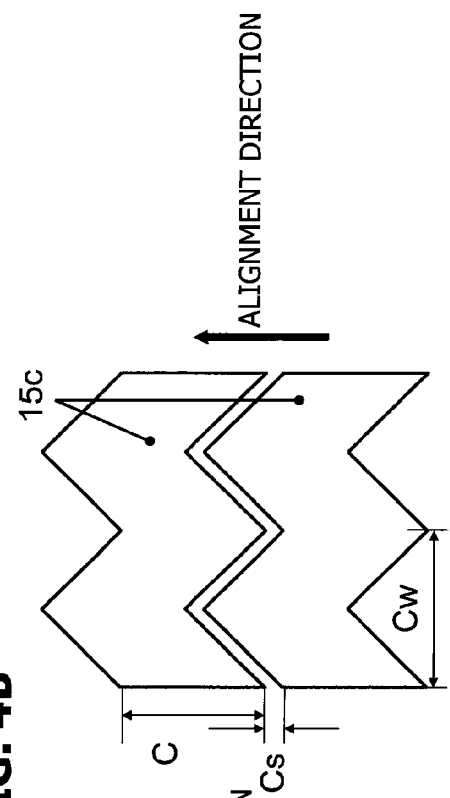
FIGS. 4A to 4C are plan views illustrating the segment electrode arrangement pattern, common electrode arrangement pattern, and some pixels resulting from their overlap in the liquid crystal display element described in an embodiment sample Sa3.
Figure 4B:
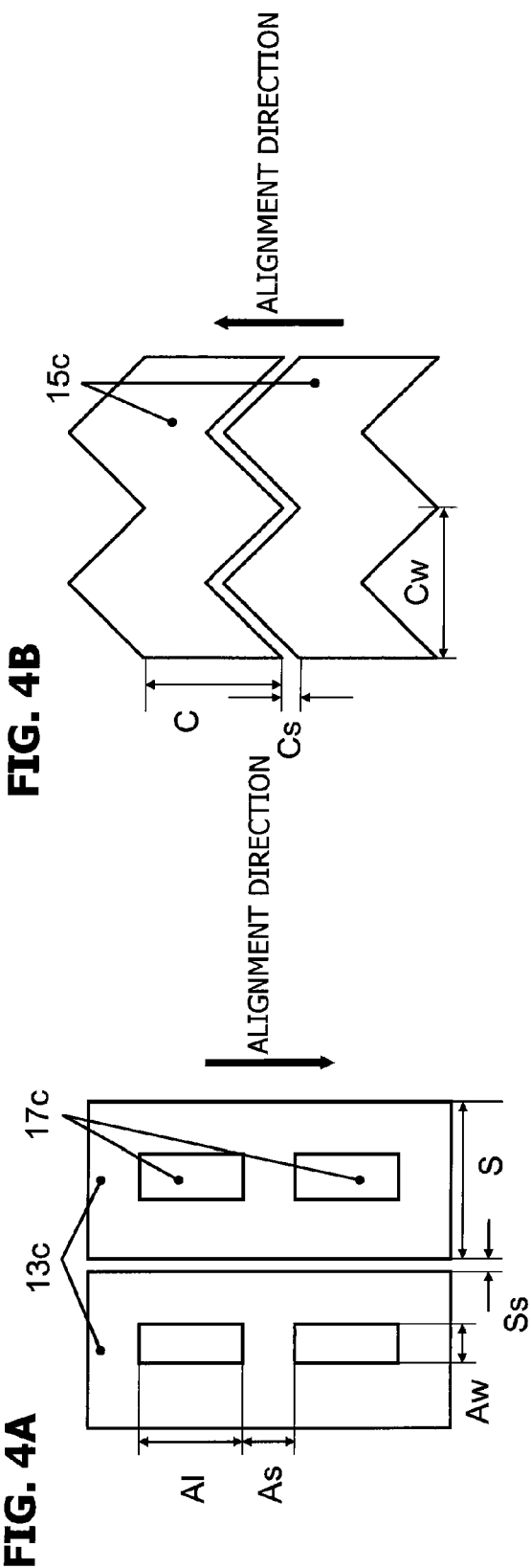
Figure 4C:
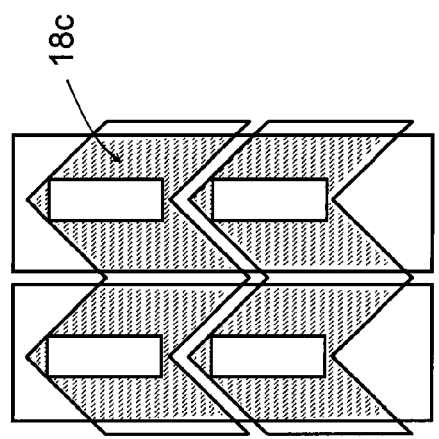

FIGS. 4A to 4C are plan views illustrating the segment electrode arrangement pattern, common electrode arrangement pattern, and some pixels resulting from their overlap in the liquid crystal display element described in an embodiment sample Sa3. The segment electrodes 13c and extended in the alignment direction have a strip-like shape with a width S of 0.42 mm and a gap Ss of 0.01 mm. The common electrodes 15c extended perpendicular to the segment electrodes 13c have a serrated shape with a serration angle of 90°, a serration interval Cw of 0.42 mm, a width C of 0.43 mm, and a gap between adjacent ones Cs of 0.01 mm. The pixels 18c are defined in an inverted "V" shape in the regions where the liquid crystal layer is sandwiched between the segment electrodes 13c and the common electrodes 15c. The openings 17c are formed in the segment electrodes 13c so that they are included in the pixels 18c. Each opening 17c is in the form of a rectangle with a long-directional length Al of 0.32 mm, a long-directional gap As of 0.1 mm between adjacent ones in the electrode, and a short-directional length Aw of 0.007 mm. Edges of the openings 18c are parallel to edges of the segment electrodes 13c in their extensive direction. It is noted that in the figures, the openings are illustrated in a larger size than actual for easy understanding. The pixels may have a normal "V" shape. For the present invention, both the normal "V" shape and the inverted "V" shape are simply referred to as "V" shape.

Figure 5A:
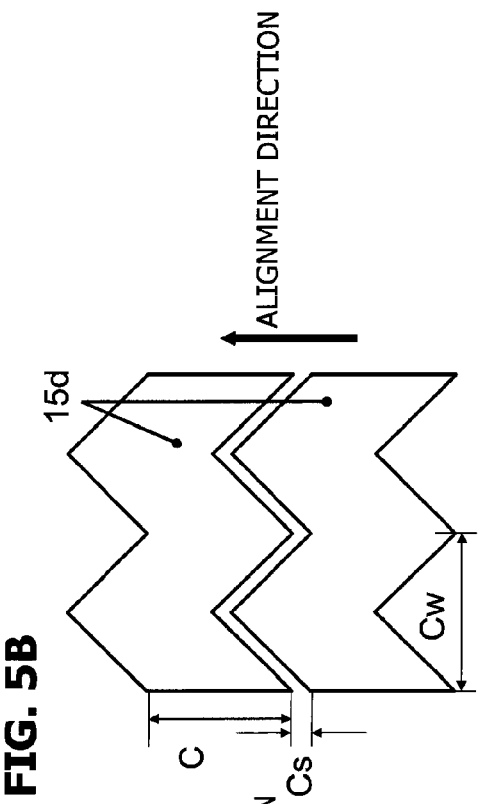
FIGS. 5A to 5C are plan views illustrating the segment electrode arrangement pattern, common electrode arrangement pattern, and some pixels resulting from their overlap in the liquid crystal display element described in an embodiment sample Sa4.
Figure 5B:
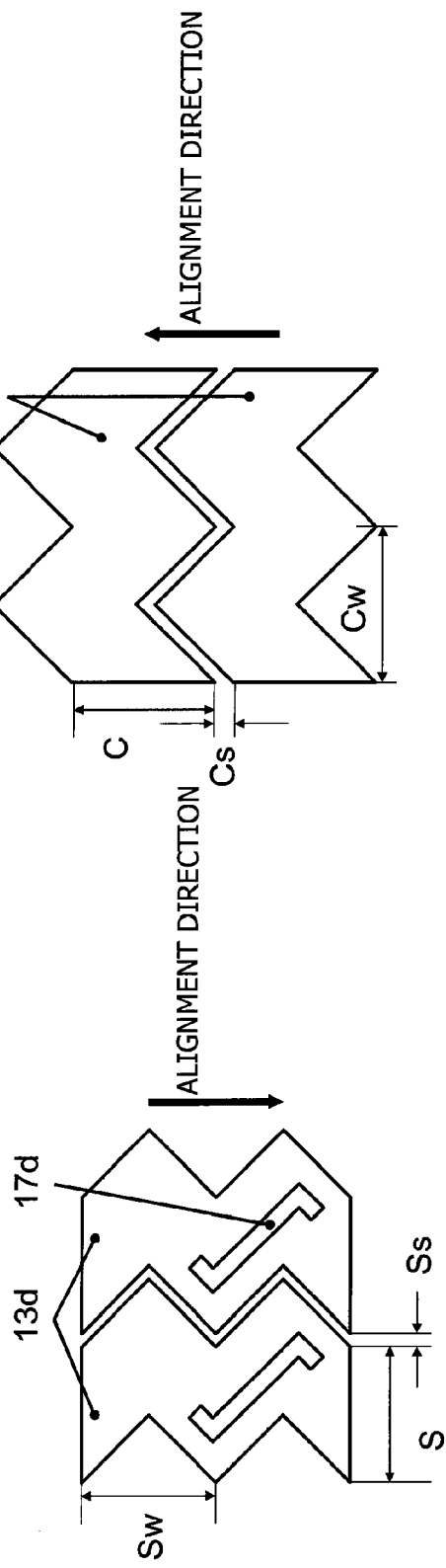
Figure 5C:
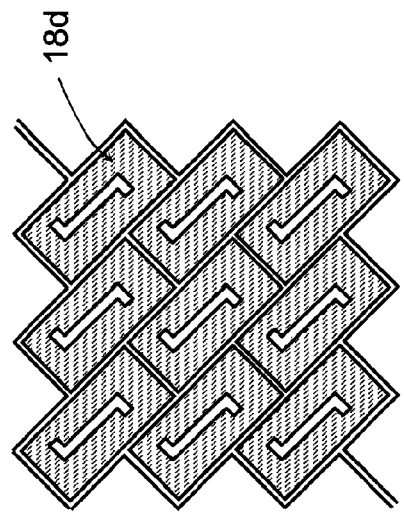

FIGS. 5A to 5C are plan views illustrating the segment electrode arrangement pattern, common electrode arrangement pattern, and some pixels resulting from their overlap in the liquid crystal display element described in an embodiment sample Sa4. The segment electrodes 13d extended in the alignment direction and the common electrodes 15d have a serrated shape with a serration angle of 90°, a serration interval Sw or Cw of 0.42 mm, a width S or C of 0.43 mm, and a gap between adjacent ones Ss or Cs of 0.01 mm. The pixels 18d are defined in the form of rectangles located in the regions where the liquid crystal layer is sandwiched between the segment electrode 13d and the common electrode 15d. Each opening 17d is in the form of an inverted "Z" shape. It is noted that in the figures, the openings are illustrated in a larger size than actual for easy understanding. The openings may have a normal "Z" shape. For the present invention, both the normal "Z" shape and the inverted "Z" shape are simply referred to as "Z" shape.

Figures 6A, 6B:
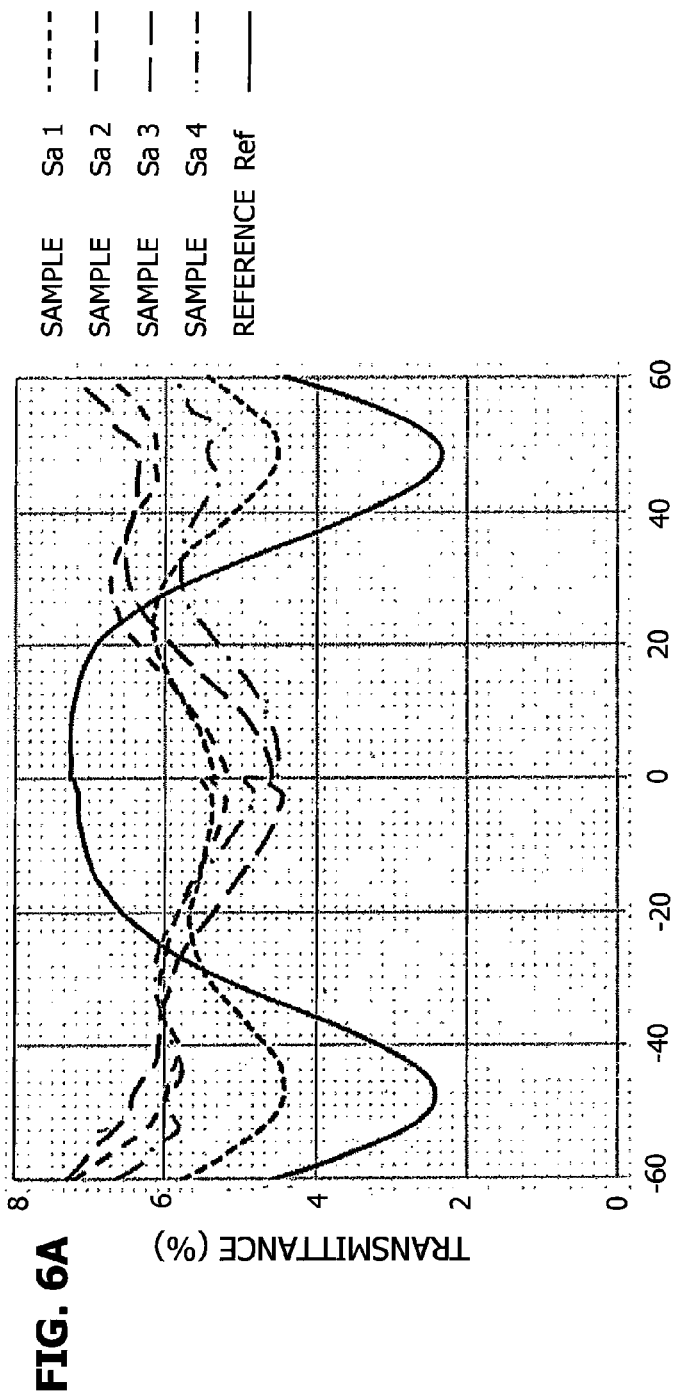
FIG. 6A is a graph illustrating the dependence of transmittance characteristics on the observation angle (−60° to)+60° for the samples Sa1 to Sa4 and a reference sample Ref.
FIG. 6B is a table that shows x,y chromaticity observations according to the XYZ colorimetric system at an observation angle of 0°, 40° or 60° for the samples Sa1 to Sa4 and the reference sample Ref.

FIG. 6A is a graph illustrating the dependence of transmittance characteristics on the observation angle (−60° to +60° for the samples Sa1 to Sa4 and a reference sample Ref. FIG. 6B is a table that shows x,y chromaticity observations according to the XYZ colorimetric system at an observation angle of 0°, 40° or 60° for the samples Sa1 to Sa4 and the reference sample Ref. Here, the reference sample Ref has the same structure as the above-mentioned second conventional liquid crystal display element. The samples Sa1 to Sa4 and the reference sample Ref were multiplex-driven under the conditions of 250 Hz frame frequency, 1/64 duty, 1/12 bias, and a voltage that gives the maximum contrast.

It is observed in FIG. 6A that the transmittance in the case of observation from the normal direction (observation angle 0°) is lower for the samples Sa1 to Sa4 than for the reference sample Ref. This is considered to be because the samples Sa1 to Sa4 have openings in the segment electrodes to reduce the effective aperture ratio. For all of the samples Sa1 to Sa4, however, the transmittance improves at large observation angles, making the shape of the transmittance characteristics curves considerably flat as a whole. In particular, it is seen that the changes in hue in the observation angle range from 40° to 60° in the samples Sa1 to Sa4 are significantly smaller than those in the reference sample Ref.

These results indicate that in a vertically aligned liquid crystal display element provided with a viewing angle compensation plate on both sides of the liquid crystal cell, the viewing angle characteristics are improved when openings are formed in either of the opposed electrodes in such a manner that the edges of the openings are parallel to the edges of the electrode in the extensive direction. Specifically, in said liquid crystal display element, the transmittance characteristics flatten and the changes in hue decrease.

The present inventors continued study for evaluation of the influence of the number of openings formed in each pixel in a vertically aligned liquid crystal display element having viewing angle compensation plates and having openings in the electrodes.

FIGS. 7A to 7C are plan views illustrating the segment electrode arrangement patterns used in samples Sa5 to Sa7. In the samples Sa5 to Sa7, each liquid crystal display element has a structure similar to that in the sample Sa1, in which one to three openings are aligned in the direction perpendicular to the extensive direction of the segment electrodes (i.e. the left and right direction). In the sample Sa5, the openings 17 are formed in the segment electrodes 13 so that they are located in the central region of each pixel as seen in FIG. 7A. Namely, the sample Sa5 is same as the sample Sa1. The sample Sa6 provides a sample in which two openings are contained in each pixel and located at regular intervals in the extensive direction of the segment electrodes as illustrated in FIG. 7B. The sample Sa7 provides a sample in which three openings are contained in each pixel and located at regular intervals in the extensive direction of the segment electrodes as illustrated in FIG. 7C.

Figures 8A, 8B:
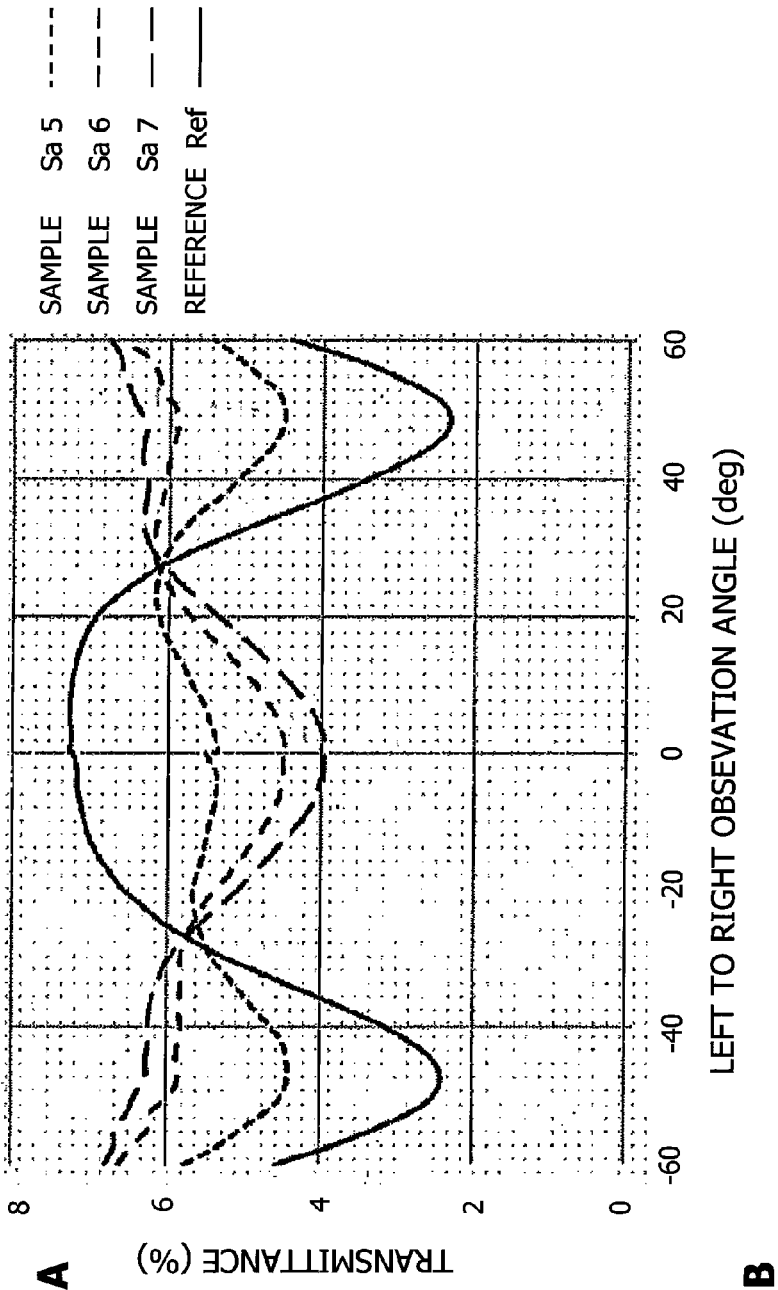
FIG. 8A is a graph illustrating the dependence of transmittance characteristics on the observation angle (−60° to)+60° for the samples Sa5 to Sa7 and a reference sample Ref.
FIG. 8B is a table that shows x,y chromaticity observations according to the XYZ colorimetric system at an observation angle of 0°, 40° or 60° for the samples Sa5 to Sa7 and the reference sample Ref.

FIG. 8A is a graph illustrating the dependence of transmittance characteristics on the observation angle (−60° to +60° for the samples Sa5 to Sa7 and a reference sample Ref. FIG. 8B is a table that shows x,y chromaticity observations according to the XYZ colorimetric system at an observation angle of 0°, 40° or 60° for the samples Sa5 to Sa7 and the reference sample Ref. These graphs suggest that in any of the samples Sa5 to Sa7, the transmittance improves and the changes in hue decrease at larger observation angles than in the reference sample Ref. With respect to the influence of the number of openings contained in each pixel, it is found that the light transmittance improves and the color shift decrease at larger observation angles in the left and right direction as the number of openings increases. With respect to the changes in hue, it is noted that slight yellowing was found as the number of openings increased.

Discussed below is the mechanism of the improvement in viewing angle characteristics brought about by the formation of openings in the electrodes in a vertically aligned liquid crystal display element having a viewing angle compensation plate on both sides of the liquid crystal cell.

Figure 9A:
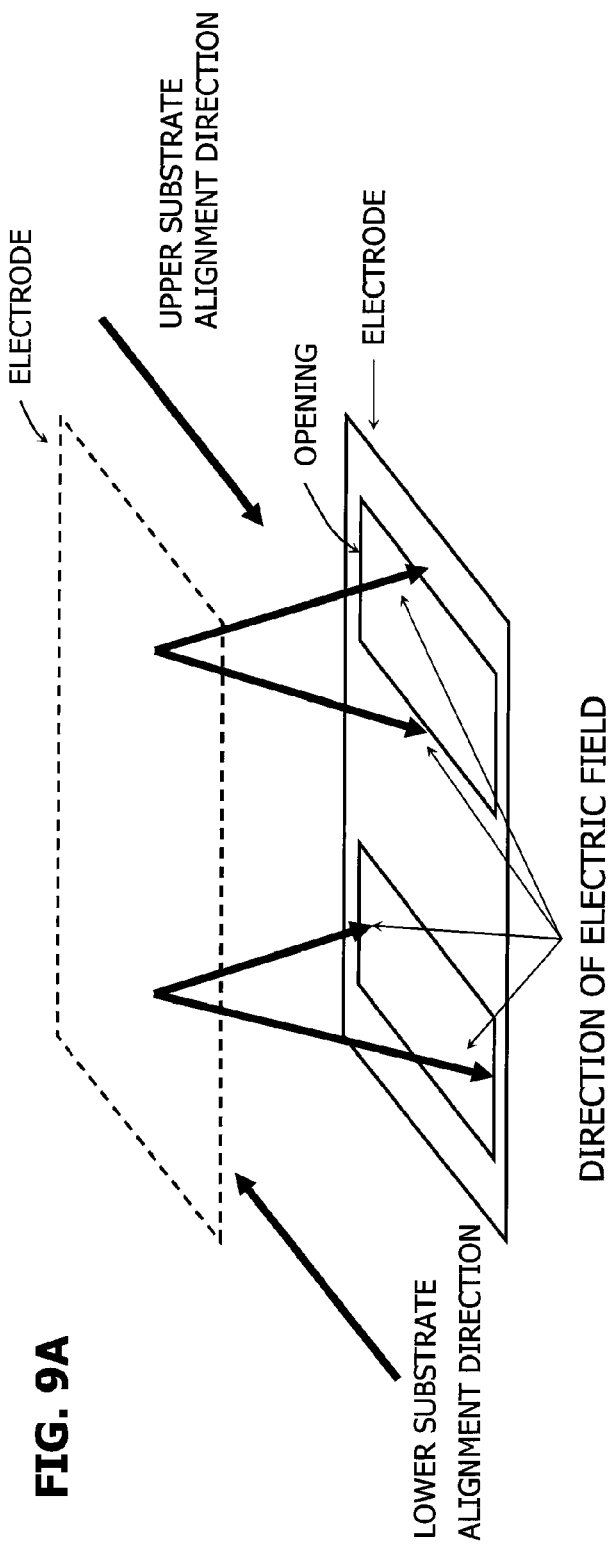
FIGS. 9A and 9B are a schematic figure illustrating the electric field around the edge of an opening under an applied voltage and a front perspective view schematically illustrating oriented molecules at the thickness-direction center of a liquid crystal layer.
Figure 9B:
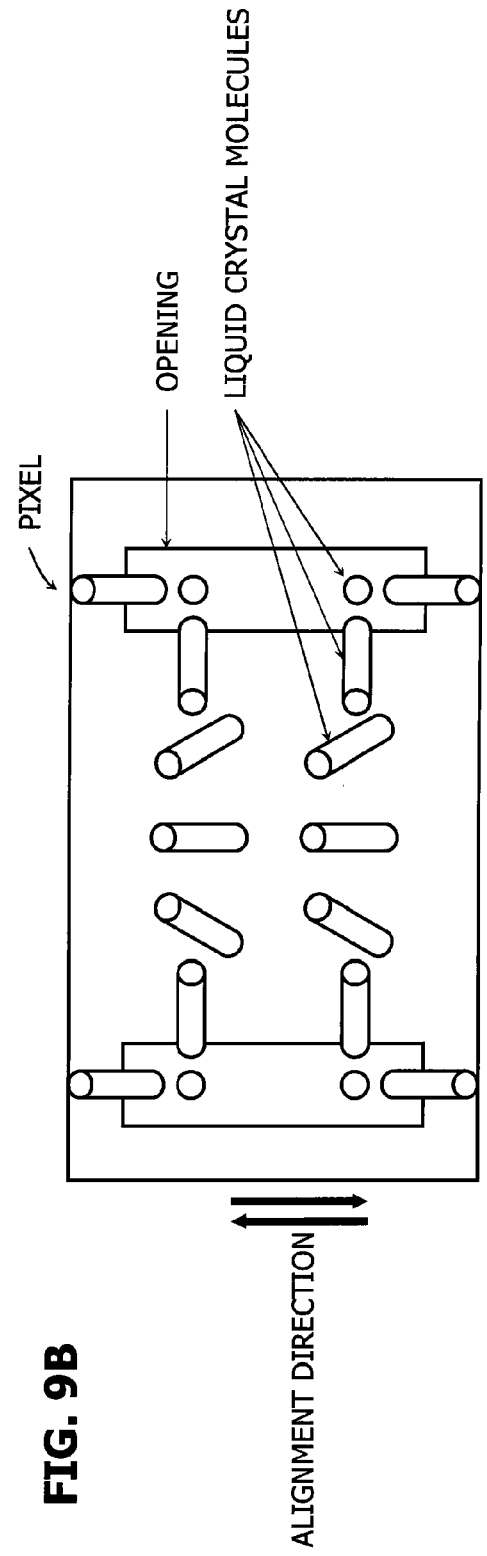

FIGS. 9A and 9B are a schematic figure illustrating the electric field around the edge of an opening under an applied voltage and a front perspective view schematically illustrating oriented molecules at the thickness-direction center of a liquid crystal layer. In the absence of applied voltage, liquid crystal molecules with a negative dielectric constant anisotropy are oriented nearly vertically to the substrate. When a voltage is applied between the electrodes, liquid crystal molecules are reoriented in the alignment direction to produce a light state in regions where an electrode exists on both the upper and lower substrates. On the other hand, liquid crystal molecules are not reoriented, failing to produce a light state, in the central region of the opening where an electrode exists only on the upper substrates. Thus, it is considered that the effective aperture ratio decreases and the transmittance also decreases in the case of observation from the normal direction as a result of the formation of openings in the electrodes. Around the edge of an opening, on the other hand, the electric flux lines coming from the portions of the electrodes opposite to each other around the opening are directed towards the edge of the opening, leading to oblique electric fields as depicted in FIG. 9A. The liquid crystal molecules located around the edge of the opening are reoriented locally along these oblique electric fields. On the substrate plane, the orientation direction of the liquid crystal molecules gradually comes closer to the alignment direction at positions away from the edge of the opening, possibly resulting in multi-domain orientation in the liquid crystal layer under an applied voltage as seen in FIG. 9B. Noted that in FIGS. 9A and 9B, the oblique electric fields and the liquid crystal molecule orientation direction around the edge of the opening are depicted only for their components perpendicular to the alignment direction, but actually a similar phenomenon must be taking place at other edge regions of openings. Thus, it is considered that the formation of openings in the electrodes leads to oblique electric fields around the edge of each opening to cause multi-domain orientation in the liquid crystal layer, resulting in averaged refractive index changes over a range of observation directions and improved viewing angle characteristics. In the case where the openings have a complicated shape containing a bent portion as in the samples Sa3 and Sa4 (such as dogleg shape and "Z" shape) or where two or more openings are contained in each pixel as in the sample Sa7, in particular, it considered that the multi-domain orientation regions increase in size during voltage application to bring about a significant improvement in viewing angle characteristics as observed above.

Figure 10A:
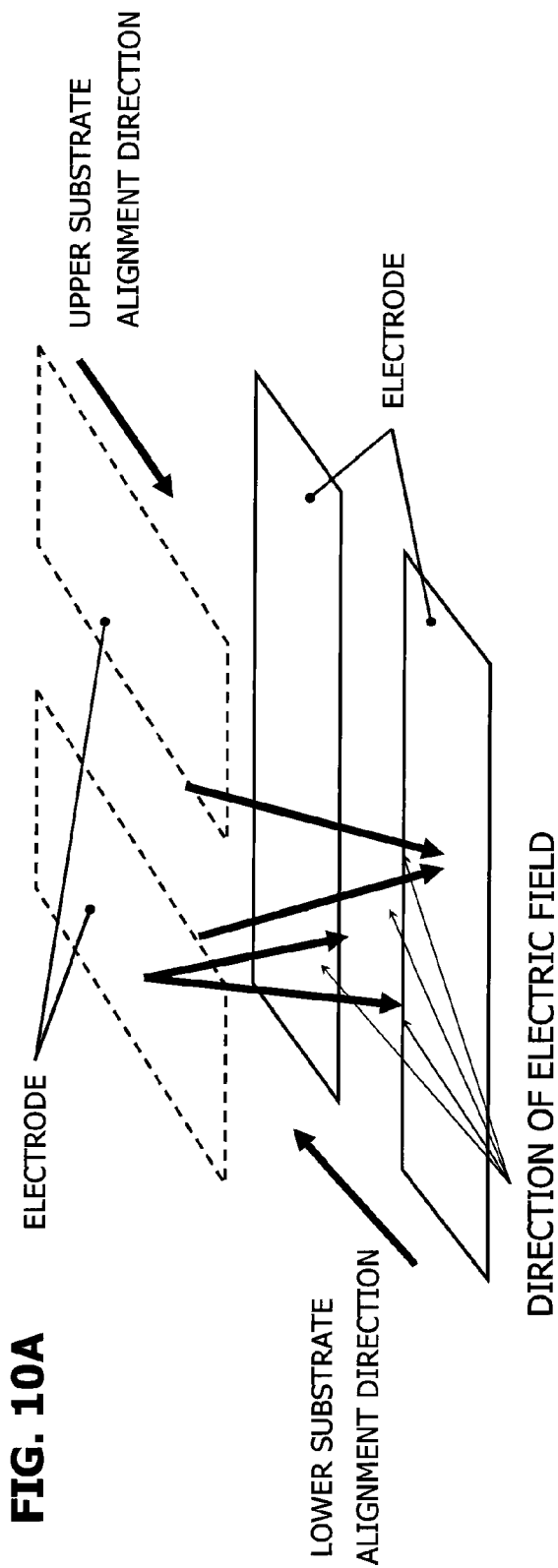
FIGS. 10A and 10B are a schematic figure illustrating the electric field around the edge of a pixel under an applied voltage and a front perspective view schematically illustrating oriented molecules at the thickness-direction center of a liquid crystal layer.
Figure 10B:
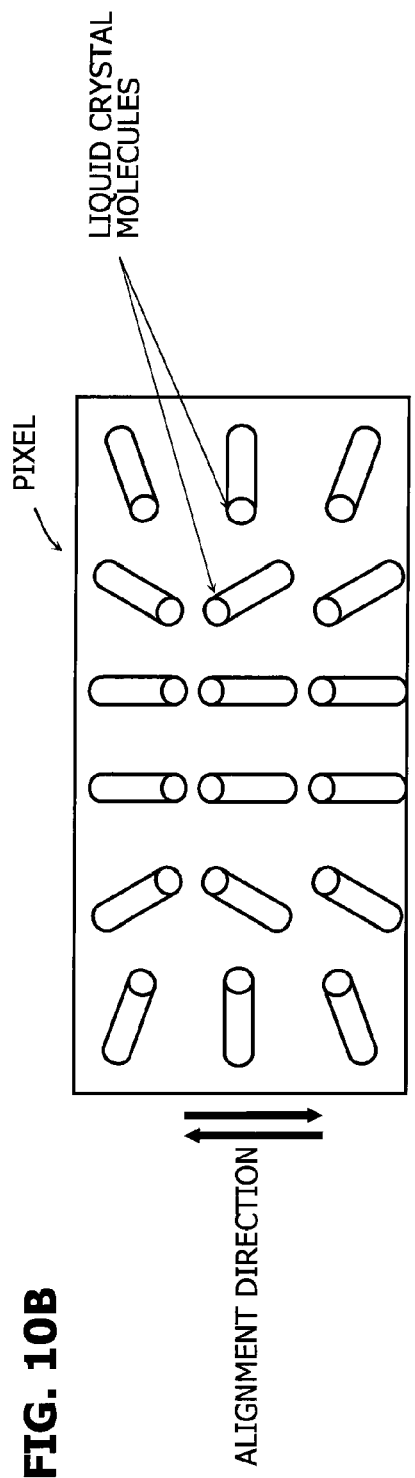

FIGS. 10A and 10B are a schematic figure illustrating the electric field around the edge of a pixel under an applied voltage and a front perspective view schematically illustrating oriented molecules at the thickness-direction center of a liquid crystal layer. It is considered that electric flux lines generated by the opposed electrodes in the spaces between segment electrodes or between common electrodes extend towards the edges of the respective electrodes to produce oblique electric fields around the edges of each pixel as illustrated in FIG. 10A through the same mechanism as for the electric fields around the edges of each opening. It is likely that the liquid crystal molecules located near the edges of a pixel are re-oriented locally along these oblique electric fields to produce a multi-domain orientation region as illustrated in FIG. 10B. This multi-domain orientation region formed around the edges of a pixel is also expected to contribute to the improvement in viewing angle characteristics. In the case of a pixel of a shape containing edges that intersect with perpendiculars to the alignment direction as in the samples Sa2 and Sa3 (such as "V" shape and dogleg shape), in particular, a larger multi-domain orientation region is expected to be produced to contribute to the improvement in viewing angle characteristics.

As discussed above, it appears to be preferable that in the case where importance is given to improvement in the viewing angle characteristics at large observation angles, the size of the openings in the long-direction is increased in the extensive direction while the size of the openings in the width direction and their intervals in the width direction are reduced to increase their density, in order to increase the size of the multi-domain orientation regions in the liquid crystal layer. Here, the long-directional gaps between the openings may be eliminated to form one continuous opening extending in the electrode extensive direction. The openings may have, for instance, a "X", "U", "S", or "O" shape containing a bent portion and may be extended in the extensive direction of the electrodes that contain them.

Openings may be formed in the common electrodes instead of the segment electrodes, or may be formed in both the common electrodes and segment electrodes. The relations among the direction of the extending opening and the extending electrode, the alignment direction, the direction of the absorption axis in the polarizing plate and so on may not be the same as the embodiments. The embodiments use a negative biaxial film on both sides of the liquid crystal cell, but this invention is not limited thereto. A negative uniaxial film may be provided on one side of the liquid crystal cell and a negative biaxial film may be provided on the other side of the liquid crystal cell. The viewing angle compensation plate provided on one side of the liquid crystal cell and the viewing angle compensation plate provided on the other side may have different optical characteristics. It is known that in general, the thickness-direction retardation in a viewing angle compensation plate is preferably about 0.5 to 1 times the retardation in the liquid crystal layer. Then two or more viewing angle compensation plates may be used to adjust the thickness-direction retardation in cases where the retardation of the liquid crystal layer would be too large.

All examples and conditional language recited herein are intended for pedagogical purposes to aid the leader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A simple matrix type dot-matrix liquid crystal display element comprising:
    a first and a second transparent substrate disposed opposite to each other;
    two or more first transparent electrodes that are disposed on a face of the first transparent substrate, said face facing to the other substrate, and that are extended as a whole in a first direction;
    two or more second transparent electrodes that are disposed on a face of the second transparent substrate, said face facing to the other substrate, and that are extended as a whole in the perpendicular direction to said first direction;
    a first and a second vertical alignment film disposed on the opposed side of the first and the second transparent substrate to cover the first and the second transparent electrodes, respectively;
    a liquid crystal layer disposed between the opposed faces of the first and the second transparent substrate and having a negative dielectric constant anisotropy and a retardation of more than 450 nm;
    a first and a second viewing angle compensation plate disposed on the unopposed faces of the first and the second transparent substrate, respectively; and
    a first and a second polarizing plate disposed in a nearly crossed Nicols arrangement outside the first and the second viewing compensation plate, respectively;
    wherein:
    at least either of the first and the second vertical alignment film is treated by an alignment process in a second direction that contains a component of the first direction;
    each pixel formed by the first and the second electrode overlapping each other with said liquid crystal layer sandwiched in between have two or more sides that intersect with perpendiculars to said second direction; and
    in those portions that correspond to said pixels in said first transparent electrode, openings extending in said direction that contains a component of the first direction are aligned.

2. A liquid crystal display element as claimed in claim 1 wherein said first direction is the same as said second direction.

3. A liquid crystal display element as claimed in claim 1 wherein said first and said second transparent electrodes have a rectangular or a serrated shape and said pixels have a rectangular, doglegged, or "V" shape.

4. A liquid crystal display element as claimed in claim 3 wherein said openings have a rectangular, doglegged, or "V" shape whose edges are parallel to the edges of said first transparent electrodes in their extensive direction.

5. A liquid crystal display element as claimed in claim 1 wherein said openings are extended as a whole in said first direction and have one or more bent portions.

6. A liquid crystal display element as claimed in claim 1 wherein two or more openings exist in each of the regions that correspond to said pixels in said first transparent electrodes.

7. A liquid crystal display element as claimed in claim 1 wherein said first viewing angle compensation plate has a negative biaxial optical anisotropy, the slow axis of said first viewing angle compensation plate being perpendicular to the absorption axis of said adjacent first polarizing plate and at an angle of about 45 degrees to said second direction.

8. A liquid crystal display element as claimed in claim 1 wherein said first and said second viewing angle compensation plate have a negative biaxial optical anisotropy, the slow axes of said first and said second viewing angle compensation plate being perpendicular to each other, also perpendicular to the absorption axes of said adjacent first and said adjacent second polarizing plate, and at an angle of about 45 degrees to said second direction.

9. A liquid crystal display element as claimed in any of claims 1 to 8 wherein the retardation in the thickness direction between said first and said second viewing angle compensation plate is 0.5 to 1 times the retardation of said liquid crystal layer.

10. A liquid crystal display element as claimed in any of claims 1 to 8 wherein black masks that cover the spaces between said first transparent electrodes, the spaces between said second transparent electrodes, and said openings are formed
    at least on either of said first or said second transparent substrate.

* * * * *